United States Patent [19]
Uratani

[11] Patent Number: 5,940,766
[45] Date of Patent: Aug. 17, 1999

[54] PORTABLE TELEPHONE SYSTEM AND METHOD OF PERFORMING COMMUNICATION USING PORTABLE TELEPHONE SETS

[75] Inventor: Chikara Uratani, Tokyo, Japan

[73] Assignee: NEC Corporation, Tokyo, Japan

[21] Appl. No.: 08/572,422

[22] Filed: Dec. 14, 1995

[30] Foreign Application Priority Data

Dec. 15, 1994 [JP] Japan .................................. 6-332922

[51] Int. Cl.⁶ .................................................. H04Q 7/00
[52] U.S. Cl. ........................................ 455/465; 455/461
[58] Field of Search ................................ 379/58, 59, 61, 379/FOR 106; 455/89, 33.1, 88, 422, 461, 550, 465

[56] References Cited

U.S. PATENT DOCUMENTS

| | | |
|---|---|---|
| 5,231,635 | 7/1993 | Travers et al. . |
| 5,311,571 | 5/1994 | Pickert ..................................... 455/422 |
| 5,379,339 | 1/1995 | Sakamoto ................................ 455/461 |
| 5,524,277 | 6/1996 | Yoshioka et al. ....................... 455/550 |

FOREIGN PATENT DOCUMENTS

| | | |
|---|---|---|
| A0639036 | 2/1995 | European Pat. Off. . |
| 5-102921 | 4/1993 | Japan . |
| 5-167523 | 7/1993 | Japan . |
| 550912 | 7/1993 | United Kingdom .......... 379/FOR 106 |
| WO 94/05101 | 3/1994 | WIPO ........................... 379/FOR 106 |
| WO94 051012 | 3/1994 | WIPO . |

*Primary Examiner*—Dwayne D. Bost
*Assistant Examiner*—Myron K. Wyche
*Attorney, Agent, or Firm*—Sughrue, Mion, Zinn, Macpeak & Seas, PLLC

[57] ABSTRACT

A portable telephone system includes at least one master unit connected to a telephone line, and a plurality of subsidiary units for performing radio communication with the master unit. Each subsidiary unit includes radio section, a calling information memory section, and an originating circuit section. The radio section selectively performs first radio communication with the master unit and second radio communication with a remote subsidiary unit. The calling information memory section prestores a telephone number for the telephone line which is assigned to the remote subsidiary unit in correspondence with the master unit. The originating circuit section calls the remote subsidiary unit by the second radio communication. When connection for the second radio communication cannot be performed with respect to the remote subsidiary unit, the originating circuit section automatically calls the remote subsidiary unit through the telephone line by the first radio communication in accordance with the telephone number of the remote subsidiary unit which is stored in the calling information memory section.

8 Claims, 4 Drawing Sheets

PORTABLE TELEPHONE SYSTEM AND METHOD OF PERFORMING COMMUNICATION USING PORTABLE TELEPHONE SETS

BACKGROUND OF THE INVENTION

The present invention relates to a portable telephone system such as a cordless telephone system constituted by a master unit and subsidiary units and a method of performing communication using portable telephone sets and, more particularly, to a portable telephone system capable of inter-subsidiary-unit speech communication mode and a method of performing communication using the same.

Recently, a portable telephone system constituted by a master unit connected to a public telephone line and subsidiary units connected to the master unit by radio has been provided. Some telephone systems are designed to allow direct speech communication between subsidiary units. In Japanese Patent Laid-Open No. 05-167523 or 05-102921, a radio section for inter-subsidiary-unit speech communication is provided for each subsidiary unit so that inter-subsidiary-unit speech communication can be realized by allowing each subsidiary unit to make a direct telephone call by using the radio section.

In such a conventional portable telephone system capable of inter-subsidiary-unit speech communication, in performing inter-subsidiary-unit speech communication, a telephone call is made to a remote subsidiary unit by radio. When the remote subsidiary unit is in a place where no radio electric field can reach the remote subsidiary unit, the remote subsidiary unit cannot be called, and direct radio speech communication cannot be performed either. In this case, when the remote subsidiary unit has a unique public line wire number, this line wire number is dialed to call the remote subsidiary unit by using the public line, thereby performing speech communication.

As described above, according to the inter-subsidiary-unit speech communication mode in the conventional portable telephone system, if a telephone call is made to a remote subsidiary unit by radio, and the telephone call fails, the public line wire number of the remote subsidiary unit must be dialed to perform a telephone call through the public line. For this reason, a calling operation is performed redundantly. In addition, with this operation, it takes much time to call the remote subsidiary unit.

SUMMARY OF THE INVENTION

It is an object of the present invention to provide a portable telephone system and a method of performing communication using the same, which enable an automatic telephone call to and speech communication with a remote subsidiary unit through a public line by performing a calling operation with respect to the remote subsidiary unit by radio even if direct inter-subsidiary-unit radio speech communication with the remote subsidiary unit cannot be performed.

In order to achieve the above object, according to the present invention, there is provided a portable telephone system including at least one master unit connected to a telephone line, and a plurality of subsidiary units for performing radio communication with the master unit, each of the subsidiary units comprising radio communication means for selectively performing first radio communication with the master unit and second radio communication with a remote subsidiary unit, memory means prestoring a telephone number for the telephone line which is assigned to the remote subsidiary unit in correspondence with the master unit, and originating means for calling the remote subsidiary unit by the second radio communication, and for, when connection for the second radio communication cannot be performed with respect to the remote subsidiary unit, automatically calling the remote subsidiary unit through the telephone line by the first radio communication in accordance with the telephone number of the remote subsidiary unit which is stored in the memory means.

DESCRIPTION OF THE PREFERRED EMBODIMENTS

Figure 1:
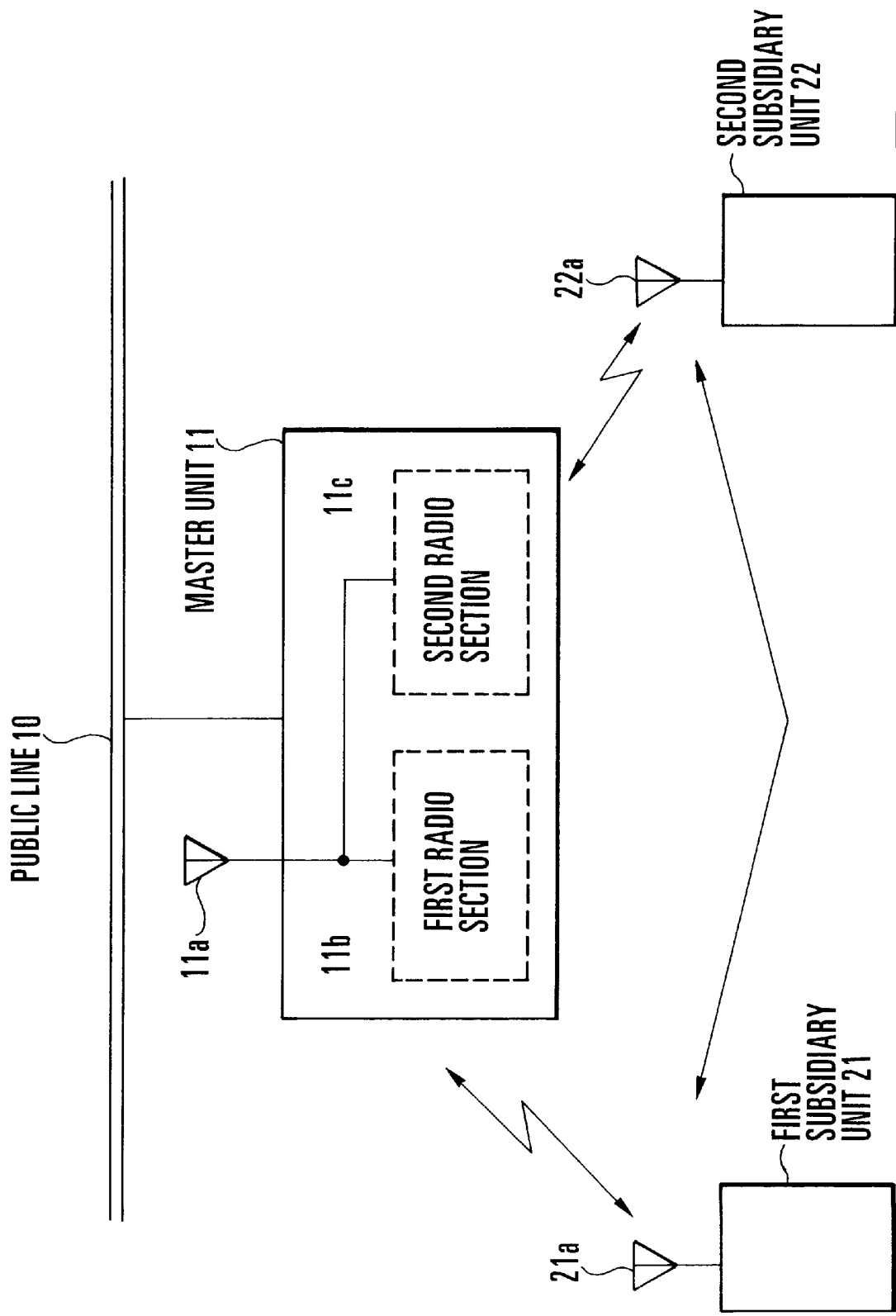
FIG. 1 is a block diagram showing the system configuration of a portable telephone system according to an embodiment of the present invention.

Embodiments of the present invention will be described next with reference to the accompanying drawings. FIG. 1 shows the system configuration of a portable telephone system to which the present invention is applied. In this embodiment, two subsidiary units 21 and 22 respectively having antennas 21a and 22a are connected to one master unit 11 having an antenna 11a by radio. The master unit 11 is connected to a public line (telephone line) 10. The master unit 11 has radio sections 11b and 11c for performing radio communication with the first and second subsidiary units 21 and 22. The first and second radio sections 11b and 11c are commonly connected to the antenna 11a. Note that the unit 11 is described in detail in Japanese Patent Laid-Open No. 5-102921. Assume that two different public line wire numbers (telephone numbers) are assigned to the master unit 11, and these line wire numbers are respectively assigned to the first and second subsidiary units 21 and 22.

Figure 2:
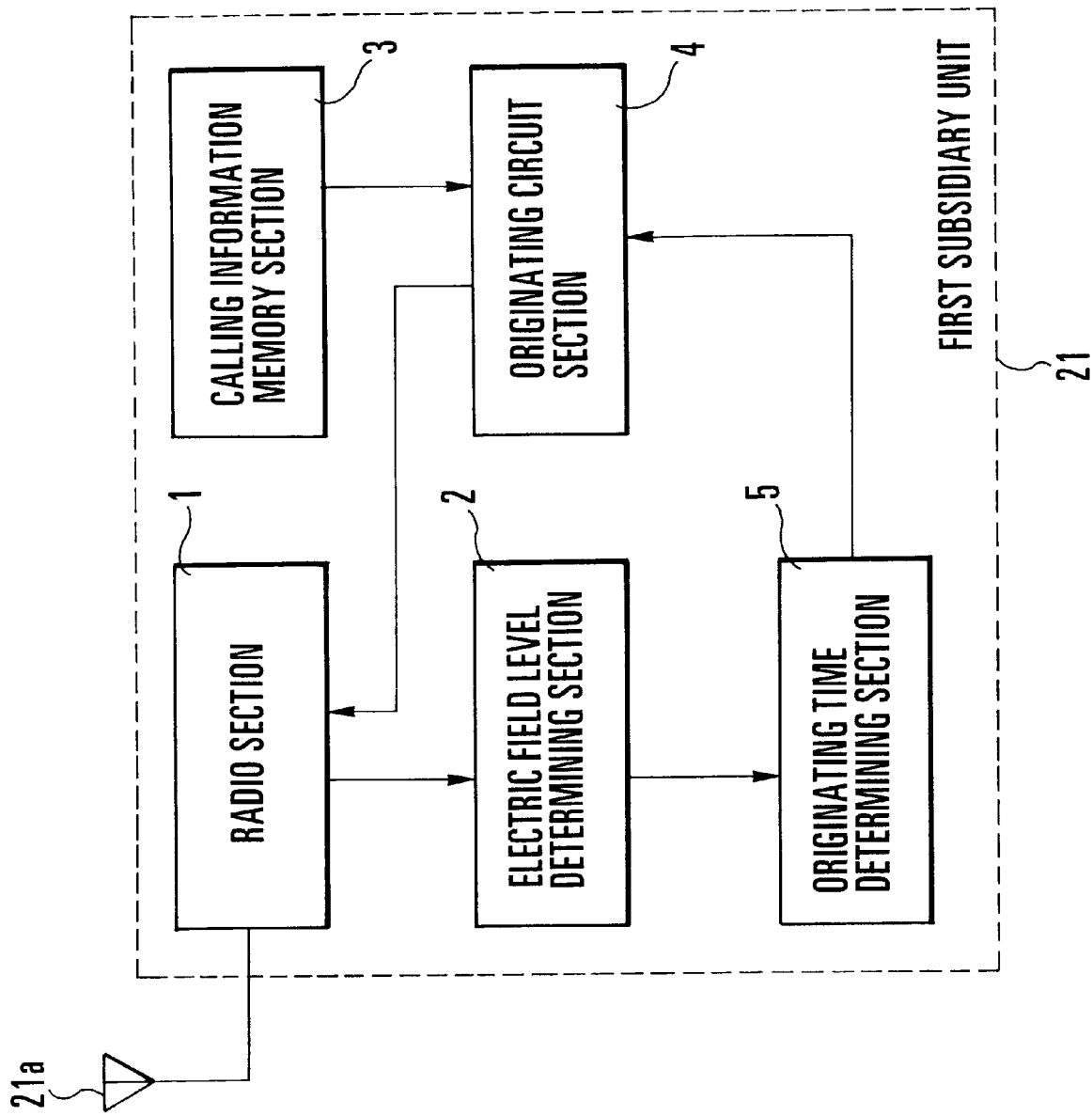
FIG. 2 is a block diagram showing the main part of the internal arrangement of a subsidiary unit in FIG. 1.

FIG. 2 shows the internal arrangement of each of the first and second subsidiary units 21 and 22. The following description is made with reference to the first subsidiary unit 21. The first subsidiary unit 21 includes a radio section 1 for commonly performing a calling operation and speech communication with the master unit 11 and the second subsidiary unit 22 by using radio signals, an electric field level determining section 2 as a radio connection detecting means for determining the electric field level of a control signal output from the remote second subsidiary unit 22, a calling information memory section 3 storing radio frequency information associated with the master unit 11 and the second subsidiary unit 22 and the public line wire number which is assigned to the second subsidiary unit 22, an originating circuit section 4 for calling the master unit 11 or the second subsidiary unit 22, and an originating time determining section 5 for determining the time taken for the originating circuit section 4 to call the second subsidiary unit 22 by radio. The calling information memory section 3 stores line wire number in correspondence with the identification code, e.g., the subsidiary unit number or the ID code, of the second subsidiary unit 22 as a remote subsidiary unit.

When the electric field level determining section 2 determines that the electric field level of the second subsidiary unit 22 is zero, the originating time determining section 5 starts to determine the time taken for the originating circuit section 4 to perform an originating operation, and counts a predetermined period of time. The originating circuit section 4 performs a radio originating operation with respect to the master unit 11 or the second subsidiary unit 22 through the antenna 21a on the basis of a frequency signal or an ID code stored in the calling information memory section 3. When the originating time determining section 5 determines the end of the calling time, the operation mode is switched to the mode of calling the second subsidiary unit 22 through the public line by using the line wire number of the second subsidiary unit 22 stored in the calling information memory section 3.

Figure 3:
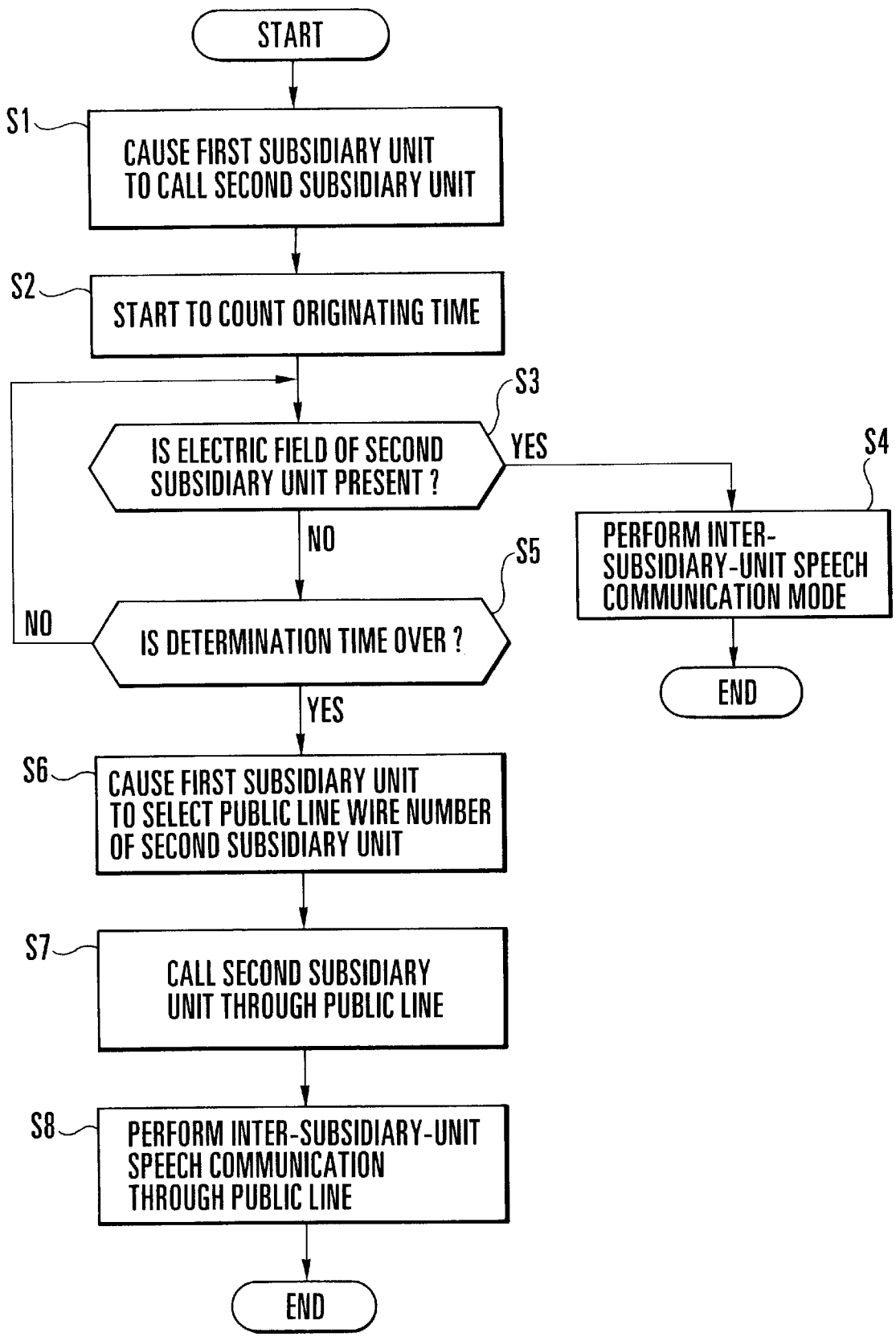
FIG. 3 is a flow chart for explaining a communicating operation of the portable telephone system in FIG. 1.

Speech communication performed by the portable telephone system having the above arrangement will be described below with reference to the flow chart in FIG. 3. When the first subsidiary unit 21 performs an operation to call the second subsidiary unit 22, the originating circuit section 4 controls the radio section 1 on the basis of the frequency information and ID code of the second subsidiary unit 22 which are stored in the calling information memory section 3, and executes a radio calling operation with respect to the second subsidiary unit 22 (step S1). At the same time, the originating time determining section 5 starts to count the time taken for the originating circuit section 4 to perform an originating operation (step S2). When the radio section 1 receives a control signal from the second subsidiary unit 22 afterward, the electric field level determining section 2 determines the electric field level of the second subsidiary unit 22 (step S3). If the electric field level determining section 2 determines that the electric field level is not zero before the originating time determining section 5 counts the predetermined period of time, it is determined that radio connection is performed, and the radio section 1 is set in the inter-subsidiary-unit speech communication mode (step S4). With this operation, direct radio communication with the second subsidiary unit 22 is performed.

If the electric field level of the second subsidiary unit 22 cannot be detected before the originating time determining section 5 completes counting of the predetermined originating time (step S5), it is determined that radio connection is not performed. The originating circuit section 4 then reads out and selects the public line wire number of the second subsidiary unit 22 in accordance with the frequency information and identification code of the master unit 11 which are stored in the calling information memory section 3 (step S6). With this operation, the originating circuit section 4 performs connection to the master unit 11 through the radio section 1, and calls the second subsidiary unit 22 through the master unit 11 and the public line 10 by using the line wire number of the second subsidiary unit 22 (step S7). As a result, the first subsidiary unit 21 can perform speech communication with the second subsidiary unit 22 through the master unit 11 and the public line 10 (step S8). In this case, for example, the radio section 1 of the first subsidiary unit 21 performs radio communication with the radio section 11b of the master unit 11, and the radio section 1 of the second subsidiary unit 22 performs radio communication with the radio section 11c of the master unit 11. The first and second radio sections 11b and 11c are connected to each other through the public line 10.

According to the subsidiary units 21 and 22, each having the above arrangement, when a given subsidiary unit performs a calling operation for direct radio speech communication with a remote subsidiary unit, and direct connection to the remote subsidiary unit cannot be performed, the operation mode is automatically switched to the mode of performing a calling operation and speech communication by using a public line by a circuit in the subsidiary unit. For this reason, the user of the subsidiary unit can perform speech communication with respect to the remote subsidiary unit by performing a calling operation only once. This offers more convenience to the users of the portable telephone sets and ensures quick speech communication.

Although the above embodiment has exemplified the first subsidiary unit 21, the second subsidiary unit 22 can also realize speech communication with the first subsidiary unit 21 in the same procedure as that described above. In addition, the present invention can be applied to a system including three or more subsidiary units in the same manner as described above.

Figure 4:
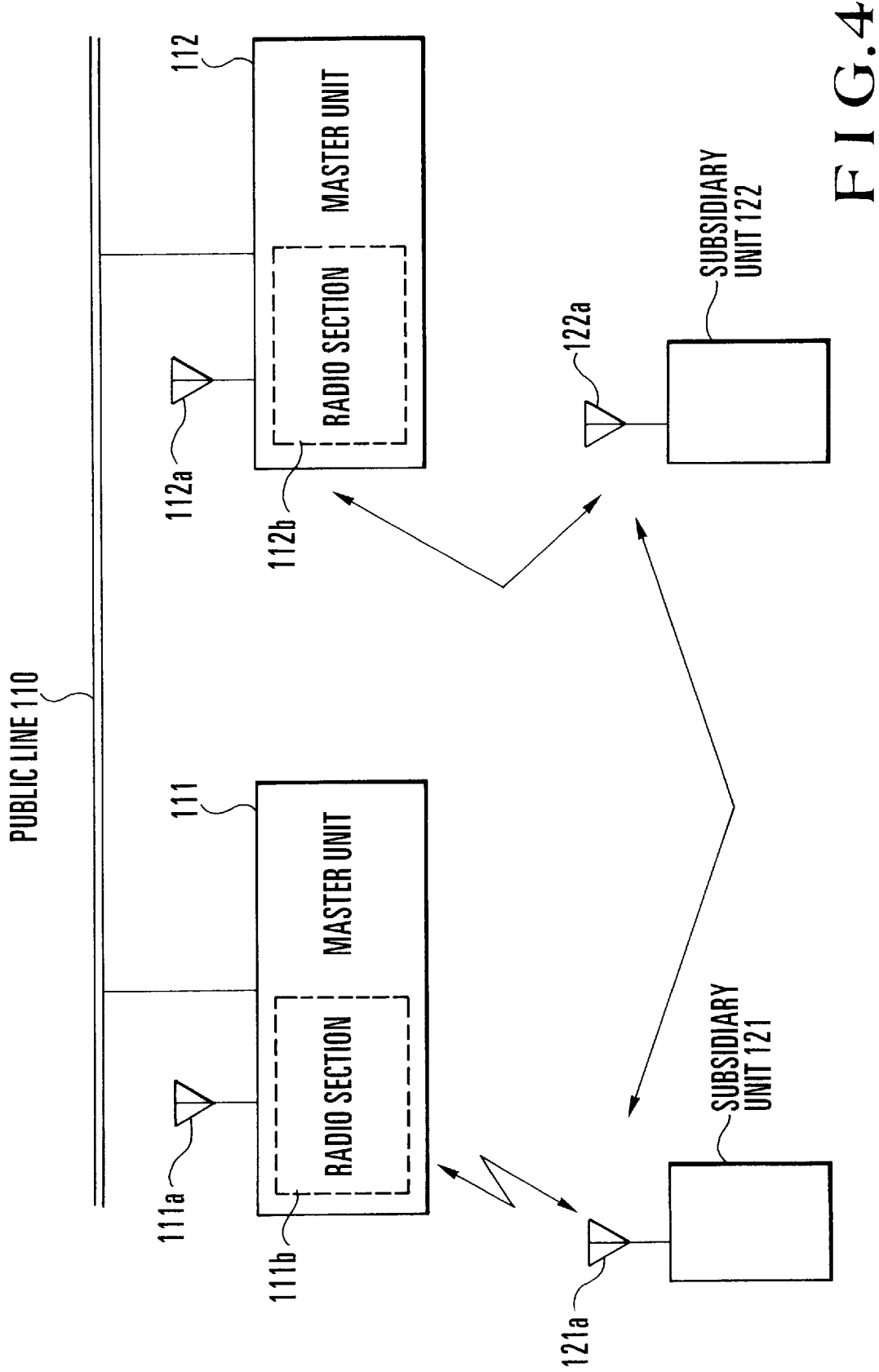
FIG. 4 is a block diagram showing the system configuration of a portable telephone system according to another embodiment of the present invention.

FIG. 4 shows the system configuration of another embodiment of the present invention. This system includes two master units 111 and 112 connected to a public line 110 by using different line wire numbers, respectively. Subsidiary units 121 and 122 respectively having antennas 121a and 122a are respectively connected to the master units 111 and 112. That is, the subsidiary unit 121 is connected to the master unit 111 by radio, and the subsidiary unit 122 is connected to the master unit 112 by radio. The master unit 111 includes an antenna 111a and a radio section 111b connected to the antenna 111a to perform radio communication with the subsidiary unit 121. The master unit 112 includes an antenna 112b and a radio section 112b connected to the antenna 112a to perform radio communication with the subsidiary unit 122. Each of the subsidiary units 121 and 122 has the same arrangement as that of the internal circuit shown in FIG. 2.

For example, the subsidiary unit 121 can therefore perform speech communication with the subsidiary unit 122 upon direct radio connection. In this case, if the subsidiary unit 121 cannot call the subsidiary unit 122 by radio, the subsidiary unit 121 performs a calling operation by using a line wire number for the public line 110 which is assigned to the subsidiary unit 122. With this operation, the subsidiary units 121 and 122 can perform speech communication with each other through the master units 111 and 112 and the public line 110. In this case, the radio section 1 of the subsidiary unit 121 performs radio communication with the radio section 111b of the master unit 111, and the radio section 1 of the subsidiary unit 122 performs radio communication with the radio section 112b of the master unit 112. The radio section 111b and the radio section 112b are connected to each other through the public line 110.

In each embodiment described above, the present invention is applied to the telephone system called a cordless telephone system. However, the present invention can be applied to portable telephone sets used in a wider moving range. In this case, since each portable telephone set as a subsidiary unit is connected to a base station by radio, radio speech communication can be performed between the respective subsidiary units by radio. In addition, such speech communication can be performed through a public line. In this case, if the radio calling mode is automatically switched to the calling mode using line wire numbers in the above manner, the convenience of the users of the portable telephone sets can be improved.

As has been described above, according to the present invention, each of a plurality of subsidiary units to which different public line wire numbers are assigned includes a radio section for performing speech communication with a master unit and another subsidiary unit. When a given subsidiary unit cannot perform radio communication with a remote subsidiary unit, the subsidiary unit automatically calls the remote subsidiary unit by using a stored line wire number through the public line. Speech communication with the remote subsidiary unit can therefore be realized when the operator of the subsidiary unit performs a calling operation only once, thereby offering more convenience to the users of the portable telephone system and realizing quick speech communication.

More specifically, in the present invention, in performing inter-subsidiary-unit speech communication, the electric field level determining section determines the electric field level of a control signal from the remote subsidiary unit. If the electric field level of the control signal from the remote subsidiary unit cannot be detected by the originating time determining section within a predetermined originating time, the originating circuit calls the remote subsidiary unit from the radio section through the master unit and the public line by using the public line wire number of the remote subsidiary unit which is stored in the calling information memory means. The user can reliably call the remote subsidiary unit by a single calling operation without discriminating inter-subsidiary-unit speech communication and speech communication through the public line.

In the portable telephone communication system for performing direct inter-subsidiary-unit speech communication, when the first subsidiary unit which performs a calling operation cannot detect the electric field level of a control signal from the second subsidiary unit on the remote side within a predetermined originating time, the first subsidiary unit performs a calling operation through the public line by using the public line wire number of the second subsidiary unit which is stored in the first subsidiary unit in advance. With this operation, speech communication between the first and second subsidiary units can be reliably and quickly realized.

What is claimed is:

1. A portable telephone system comprising at least one master unit connected to a telephone line, and a plurality of subsidiary units for performing radio communication with said master unit, each of said subsidiary units including:
   radio communication means for selectively performing first radio communication with said master unit and second radio communication with a remote subsidiary unit;
   memory means prestoring a telephone number for the telephone line which is assigned to said remote subsidiary unit in correspondence with said master unit; and
   originating means for directly calling said remote subsidiary unit by the second radio communication, and for, when direct connection for the second radio communication cannot be performed with respect to said remote subsidiary unit, automatically calling said remote subsidiary unit through the telephone line by the first radio communication in accordance with the telephone number of said remote subsidiary unit which is stored in said memory means.

2. A system according to claim 1, further comprising radio connection detecting means for detecting connection for the second radio communication with respect to said remote subsidiary unit, and originating time determining means for determining whether an originating time taken for the second radio communication with said remote subsidiary unit is not less than a predetermined period of time, and instructing said originating means to call said remote subsidiary unit by the first radio communication when the calling time is not less than the predetermined period of time.

3. A system according to claim 2, wherein said radio connection detecting means detects connection to said remote subsidiary unit by the second radio communication by determining whether the electric field level of the control signal from said remote subsidiary unit is zero.

4. A system according to claim 1, wherein said master unit includes a first master unit which is connected to the telephone line and to which at least two telephone numbers are assigned, said plurality of subsidiary units include first and second subsidiary units which perform the first radio communication with said first master unit and the second radio communication between said subsidiary units and to which the two line wire numbers of said first master unit are respectively assigned, and said first master unit comprises at least two radio communication sections for performing the first radio communication with said first and second subsidiary units.

5. A system according to claim 1, wherein said master unit includes first and second master units which are connected to the telephone line and to which at least one telephone number is assigned, said plurality of subsidiary units include first and second subsidiary units which respectively perform the first communication with said first and second master units and perform the second radio communication between said subsidiary units and to which line wire numbers of said first and second master units are respectively assigned, and each of said first and second master units comprises at least one radio communication section for performing the first radio communication with a corresponding one of said first and second subsidiary units.

6. A portable telephone communication method comprising the steps of:
   assigning telephone numbers corresponding to a master unit to a plurality of subsidiary units for performing radio communication with at least one master unit connected to a telephone line;
   calling a remote subsidiary unit, with which communication is to be performed, by second direct radio communication between subsidiary units; and
   automatically calling said remote subsidiary unit by the first radio communication through the telephone line in accordance with the telephone number assigned to said remote subsidiary unit when direct connection for the second radio communication with said remote subsidiary unit cannot be performed.

7. A method according to claim 6, further comprising the step of counting a calling time taken for the second radio communication, and the step of determining whether the calling time taken for the second radio communication is not less than a predetermined period of time.

8. A method according to claim 7, the step of determining whether the calling time taken for the second radio communication is not less than a predetermined period of time includes the step of detecting connection with said remote subsidiary unit by the second radio communication by determining whether an electric field level of a control signal from said remote subsidiary unit is zero.

* * * * *